(12) United States Patent
Butterworth

(10) Patent No.: US 8,391,449 B2
(45) Date of Patent: Mar. 5, 2013

(54) TELECOMS

(75) Inventor: Martyn Ian Butterworth, Lancashire (GB)

(73) Assignee: Ryou Capital, L.L.C., Dover, DE (US)

( * ) Notice: Subject to any disclaimer, the term of this patent is extended or adjusted under 35 U.S.C. 154(b) by 3035 days.

(21) Appl. No.: 09/858,174

(22) Filed: May 15, 2001

(65) Prior Publication Data

US 2001/0046279 A1 Nov. 29, 2001

(30) Foreign Application Priority Data

May 17, 2000 (GB) .................................. 0011747.3

(51) Int. Cl.
*G06Q 30/00* (2012.01)
*G05B 19/418* (2006.01)
(52) U.S. Cl. .................. 379/88.13; 348/14.01; 705/14.4
(58) Field of Classification Search ............... 379/88.13; 348/14; 705/14.4
See application file for complete search history.

(56) References Cited

U.S. PATENT DOCUMENTS

| | | | |
|---|---|---|---|
| 4,811,382 A | 3/1989 | Sleevi | |
| 5,073,927 A | 12/1991 | Grube | |
| RE34,380 E * | 9/1993 | Sleevi | 379/88.25 |
| 5,286,691 A | 2/1994 | Harandi et al. | |
| 5,428,670 A * | 6/1995 | Gregorek et al. | 379/67.1 |
| 5,448,625 A * | 9/1995 | Lederman | 379/88.25 |
| 5,559,868 A | 9/1996 | Blonder | |
| 5,652,784 A * | 7/1997 | Blen et al. | 379/67.1 |
| H1714 H * | 3/1998 | Partridge, III | 348/14.01 |
| 5,761,279 A | 6/1998 | Bierman et al. | |
| 5,907,604 A | 5/1999 | Hsu | |
| 5,937,037 A * | 8/1999 | Kamel et al. | 379/88.19 |
| 6,205,432 B1 * | 3/2001 | Gabbard et al. | 705/14 |
| 6,618,474 B1 | 9/2003 | Reese | |
| 2003/0086558 A1 | 5/2003 | Seelig et al. | |
| 2003/0231749 A1 | 12/2003 | Ansley et al. | |

FOREIGN PATENT DOCUMENTS

| | | |
|---|---|---|
| DE | 19940400 A1 | 3/2001 |
| EP | 0741484 A2 | 11/1996 |
| EP | 0973309 A2 | 1/2000 |
| EP | 0994624 | 4/2000 |
| EP | 1198114 A2 | 4/2002 |
| EP | 1317122 A2 | 6/2006 |
| FR | 2756695 A3 | 6/1998 |
| FR | 2802746 A1 | 6/2001 |
| GB | 2206265 A | 12/1988 |
| GB | 2344020 | 5/2000 |
| GB | 2360418 A | 9/2001 |
| JP | 9247276 A | 9/1997 |
| JP | 11308589 | 11/1999 |
| WO | 9106187 A1 | 5/1991 |

(Continued)

OTHER PUBLICATIONS

"Telstra trials cell broadcasting", Global Wireless , v 1 , n 6 , p. 25, Nov. 1998.*

*Primary Examiner* — Victoria Vanderhorst
(74) *Attorney, Agent, or Firm* — Brundidge & Stanger, P.C.

(57) ABSTRACT

The invention concerns improvements to telecoms systems. In the proposed method and apparatus, an image (which may have advertising content) is displayed to a caller and a recipient prior to relaying a caller message. This supplementary image may take the place of conventional text such as CALLING. On audio/visual equipment, an audio message may take the place of a ringing tone.

14 Claims, 3 Drawing Sheets

FOREIGN PATENT DOCUMENTS

Figure 1:
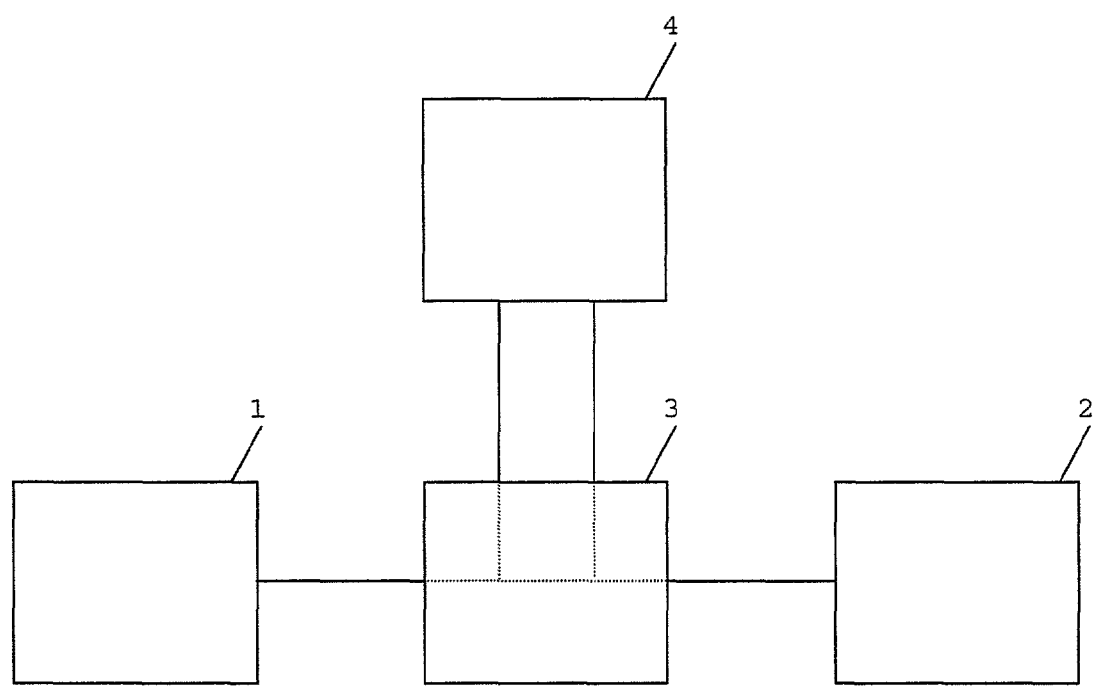

| | | | |
|---|---|---|---|
| WO | 9605684 | A1 | 2/1996 |
| WO | 9624213 | A1 | 8/1996 |
| WO | 0038399 | A2 | 6/2000 |
| WO | 0044151 | A2 | 7/2000 |
| WO | 0074253 | A1 | 12/2000 |
| WO | 0074379 | A1 | 12/2000 |
| WO | 0106735 | A3 | 1/2001 |
| WO | 0158178 | A2 | 8/2001 |
| WO | 0167718 | A2 | 9/2001 |
| WO | 03015430 | A1 | 2/2003 |
| WO | 03088690 | A1 | 10/2003 |
| WO | 2005013595 | A1 | 2/2005 |

* cited by examiner

TELECOMS

The invention relates to improvements to telecommunications systems. In particular, the invention relates to method and apparatus for enabling effective advertising or the passing on of supplementary visual information using the communication networks system.

Up until now, conventional advertising has been achieved by means of radio, TV, or other conventional media such as newspapers, magazines, etc. Increasingly, cold calling has gone ahead by representatives of companies using the telephone system. However, such cold calling by individuals is often un-appreciated by the recipient of the phone call and, often, the person receiving the calls will resort to any excuse to try and, reasonably politely, make their excuses to end the telephone conversation. Also, from the advertising company's point of view, it is often a thankless task cold calling since it is necessary to employ telesales staff who run the risk of frequently being verbally abused by house holders.

According to a first aspect of the invention, there is provided a method for transmitting pre-recorded images using telecom networks, whereby when telecommunications apparatus is used by a caller to send a message to a recipient, a supplementary image is visually transmitted from messaging equipment to the caller in addition to, or to replace, conventional connection messages or text.

The invention of the first aspect thereby provides a means for relaying an advertising message comprising an image (text or graphics) to a caller whilst the caller is awaiting the establishment of a connection/transmission.

Preferably, if, during transmission of the supplementary image to the caller, the telecommunications apparatus establishes a connection with the recipient, then the display of the supplementary image is terminated.

Preferably, the image is used in conjunction with traditional tones or text relayed to the caller so that if the telecom apparatus is not answered by the recipient during a predetermined time period, the image which the caller sees is replaced by the conventional tone or text.

A second aspect of the invention concerns a method for transmitting pre-recorded images using the telecom network, in which a recipient of the transmission sees a pre-recorded image upon receiving transmission, the image being relayed, prior to connection between caller and recipient being effected or prior to transmission of a message from the caller.

In the above aspects, it is preferred that such a supplementary image is presented for viewing to the caller prior to connection or prior to transmission of a message from the caller to the recipient between caller and recipient being established.

In the case of text messaging, the supplementary image is preferably placed before, after or in the text of the text message.

In the case of mixed media messages, such as video phone messaging the supplementary image may be transmitted to the recipient prior to a message from the caller being relayed to the recipient.

Preferably, the recipient is arranged to receive a further supplementary image subsequent to termination of a message from the caller.

The image seen by the recipient is preferably the same image as that seen by the caller.

The image preferably has an advertising and/or information content.

Preferably, statistical feed back concerning the number of times a given image was transmitted to a caller and/or a recipient is provided to an information provider.

Preferably, images are conveyed only to telecom system users who have indicated a willingness to receive such images or alternatively may be primarily available to all networks/systems.

Preferably, telecom users accepting such images are provided with time at subsidised prices.

The subsidy may be borne by providers of the imaging service.

The user is preferably provided with the capability of choosing the type of image they wish to receive.

According to a third aspect, there is provided apparatus for implementing a method according to any of the preceding claims, in which the apparatus comprises: means for detecting a signal on a telecom system indicating that there is an incoming message transmission; and means for responding to this detection by inserting a supplementary image or images into the message transmission.

The apparatus may be arranged to transmit the supplementary image(s) to a caller, and/or it may be arranged to insert the supplementary image(s) into the message and relay the message with inserted supplementary image(s) to a recipient.

Preferably, in the case of text messaging the supplementary image(s) is/are inserted in a part of a message from the caller and will be visible to the recipient on retrieval of the text message.

Preferably, the supplementary image is displayed to the recipient during an initial answer phase immediately following connection being established or message transmission.

Preferably, said apparatus comprises cellular/wired telecommunications systems and other terrestrial or satellite transmissions capable of receiving text messaging.

Preferably, the telecommunications system may be configured so as to convey such supplementary images only to system users who have indicated a willingness to receive such images.

Telecommunications system users indicating such a willingness are preferably provided with communications at subsidised prices.

The subsidy is preferably borne by providers of the imaging service.

Preferably, a system user is provided with the capability of choosing the type of image they wish to receive alternatively, choice of image type may be made by a service provider.

The image may also have an audible message associated with it and transmitted to the caller during a predetermined time period.

The telecommunications apparatus may comprise a telephone receiver or computer or television receiver or other device referred to simply hereinafter as telecom apparatus.

The telecom apparatus may be a domestic or commercial system.

The predetermined time period, in a preferred audible embodiment, is five seconds. However, it will be appreciated that alternative time durations may be possible or desirable.

In preferred embodiments, the predetermined time period may be selected by an advertising organisation. In the case of mixed video/audio transmissions, the advertising organisation may pay an imaging service provider according to the length of the predetermined time period or other criteria such as the particular time during the day in which a particular image is to be transmitted when an incoming call is detected.

Figure 2:
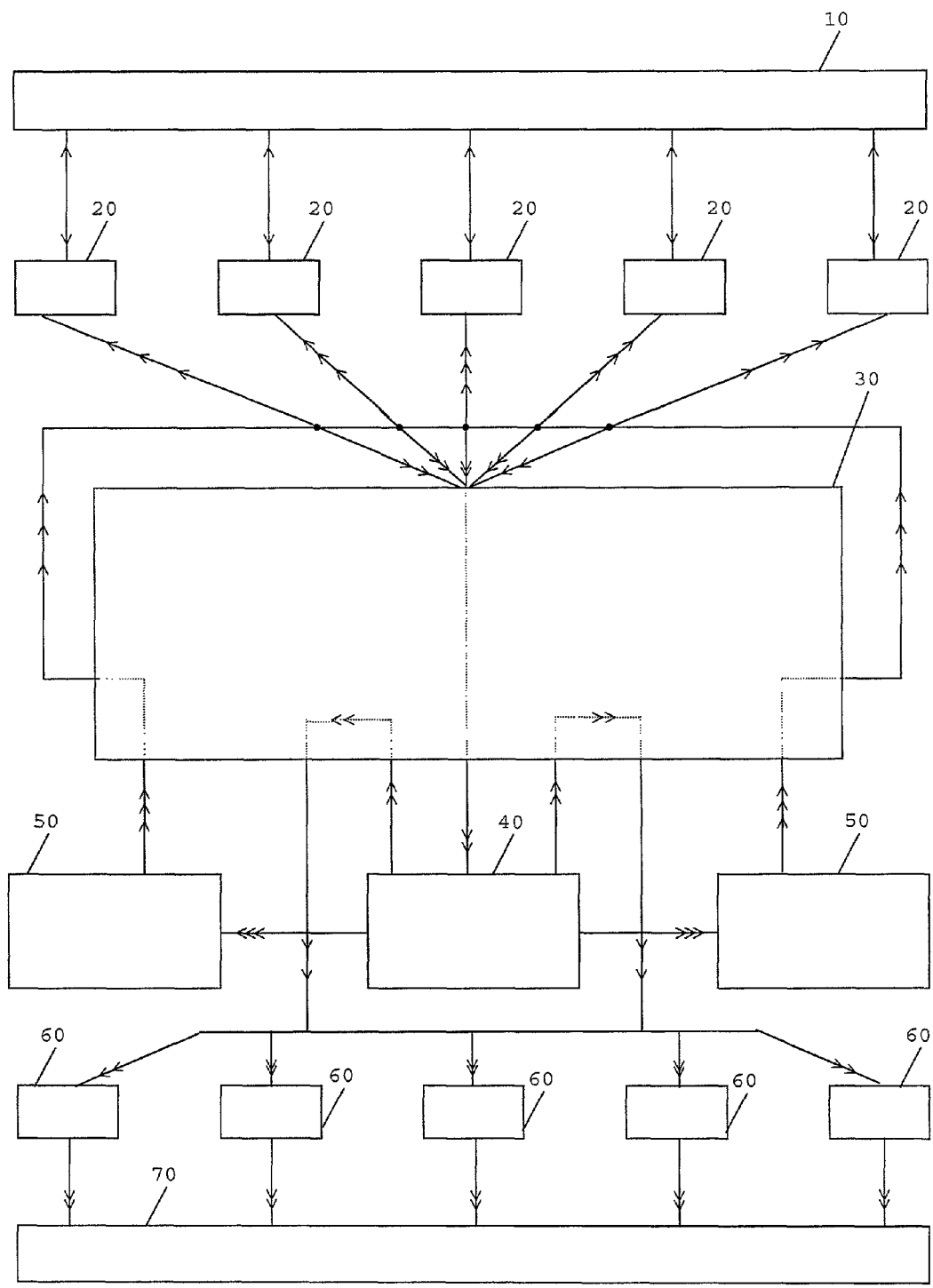
Figure 3:
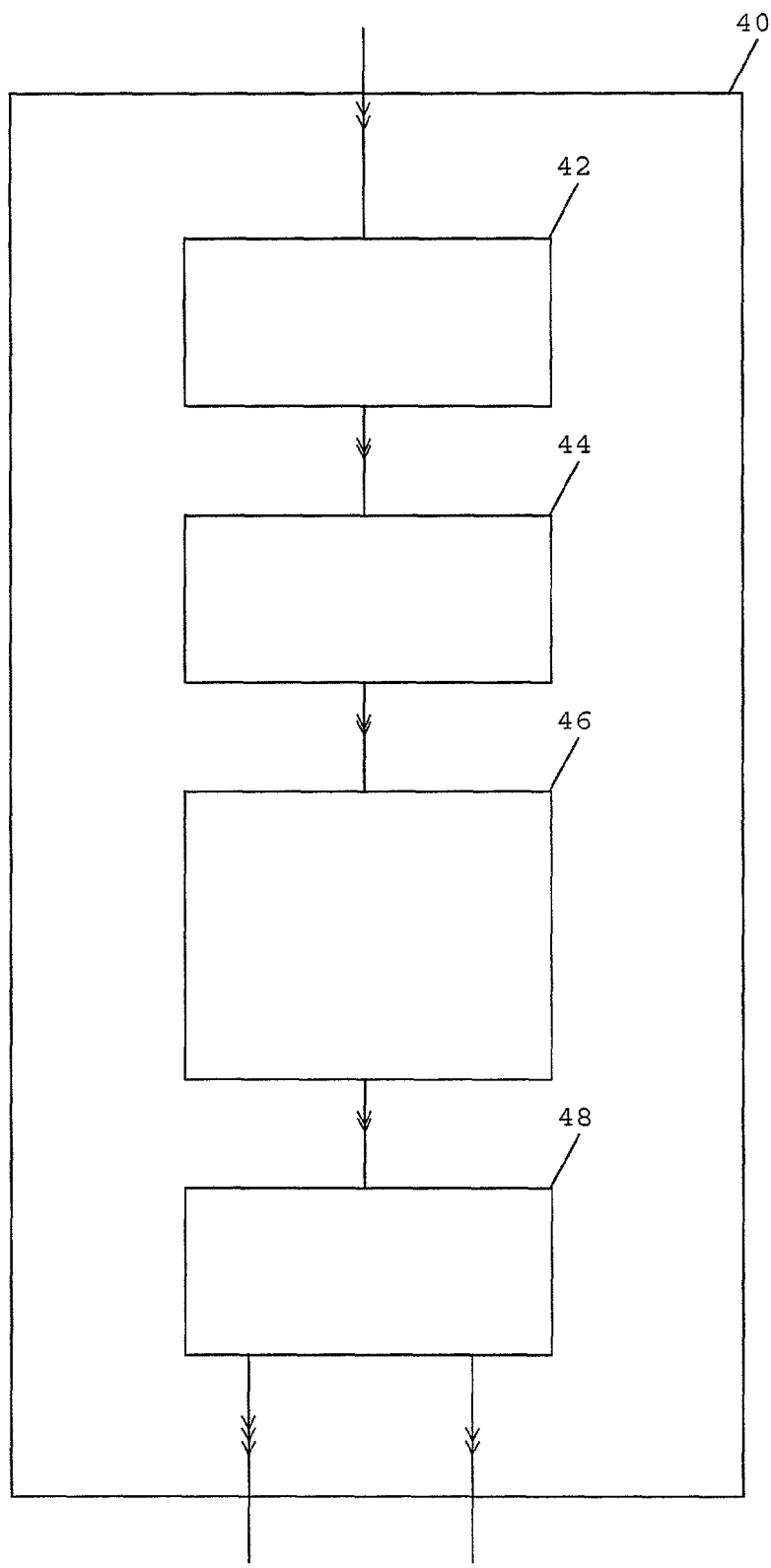

For a better understanding of the invention, and to show how embodiments of the same may be carried into effect, reference will now be made, by way of example, to the accompanying diagrammatic drawing, in which:

FIG. 1 is a schematic block diagram showing how a first embodiment of a system generally in accordance with the principles of the present invention may be implemented; and FIG. 2 is a schematic block diagram showing a second embodiment of a system in accordance with the present invention; and FIG. 3 is a schematic block diagram of a master unit 40 of the FIG. 2 embodiment.

Referring now to FIG. 1, there is shown schematically caller equipment 1, recipient's equipment 2, a telecom system 3 and add on equipment 4.

The caller equipment 1 and recipient equipment 2 are standard existing equipments (at least in the preferred embodiment). In other words, they represent conventional image equipped telephone, television, computer or satellite transmitting/receiving equipment (herein referred to as telecoms apparatus). Where the term "image equipped" is used here, this means able to receive text or graphical information. Also, the systems equipment 3 is basically standard but interfaces with add on equipment 4. The add on equipment 4 is triggered by an originating caller 1 dialling (in the case of image equipped telephone equipment) a number corresponding to the connecting number of the recipient caller equipment 2. When detecting a call transmission from equipment 1 to equipment 2, the add-on equipment 4 is arranged to transmit an image to the originator caller prior to the connection tone/text. In other words, while the caller using equipment 1 is making a transmission call to recipient equipment 2, instead of (or in addition to) hearing a call tone or seeing a text such as CALLING or ESTABLISHING CONNECTION, a supplementary image is displayed to the caller for, for instance, the first few seconds. The recipient, when answering the call using the recipient telephone apparatus 2, will, instead of being connected straight away to the originating caller initially see the supplementary image from add on equipment 4. In this manner, images of an informative and/or advertising nature may be passed using the telephone network.

Referring now to FIG. 2, there is shown a second embodiment of a system in accordance with the present invention. In the embodiment shown, the apparatus comprises caller equipment 10, mobile telephone service provider equipments 20, a group connection provider 30, supplementary image insertion equipment comprising a master unit 40 and slave units 50, mobile telephone service provider equipments 60 and recipient equipment 70.

In the drawing: double arrows (>>) represent outgoing call image/message traffic to recipient; triple arrows (>>>) represent outgoing call reverse image message traffic to originating caller; and reversed arrows (<>) represent 2 way traffic to initiating caller processed by the group connection provider 30.

To describe now the operation of the system of FIG. 2, it is supposed that a particular caller 10, may wish to establish a connection with a particular recipient 70. To make the call, a caller will turn on his caller equipment 10 and it will first be established that there is a signal available via the callers particular mobile telephone service provider equipment 20. The caller will then proceed to dial a particular recipient number. Whilst the service provider equipment 20 is establishing the connection between caller/recipient, via the group connection provider equipment 30, a supplementary image for advertising may be inserted by co-operation of master/slave equipment 40, 50 and relayed to the caller. This supplementary image may be displayed to the caller whilst text such as CALLING, ESTABLISHING CONNECTION is being displayed to the user (or may be displayed instead of such text).

A supplementary image is also conveyed to the recipient by insertion of an image by the master unit 40 and conveyed to recipient 70 by the master unit 40 via the group connection provider 30 and service provider equipment 60. This supplementary image may be the same or a different image to the one received by the caller. Indeed, the image inserted may be paid for by the particular respective service providers of the caller and recipient and may accordingly be chosen by them. Alternatively, image selection may be random or simply on a time slot basis with advertisers paying for particular supplementary images at certain times. The image displayed to the recipient may be displayed during an initial period following connection, preceding the display or other conveying of the caller message. Alternatively/additionally, the image may be conveyed at the end of the caller message.

Referring now to FIG. 3, there is shown in schematic form the construction of master unit 40. The master unit 40 comprises a trigger block 42, a selector sequence block 44, an image/message insertion block 46, and a routing sequencer 48.

The trigger block 42 receives the call request from the group connection provider 30 and initiates a trigger for the selector sequence block (what does this do?) 44, this selector block 44 decides the type of image to be added to the message. This selection may be done according to a user preference, an advertiser preference, or randomly for instance. The message then arrives at the insertion block where the supplementary image(s) for the recipient/caller is/are inserted according to the selector criteria. The insertion block then passes the compound message with supplementary image to the routing sequencer 48 which then conveys this compound message to recipient via the group connection provider 30 and service provider equipments 60, as well as providing supplementary image to the caller via slave units 50.

The above assumes a cell phone type network, cable phone or land line. It will be appreciated that the principles of the invention also extend to other types of messaging such as emails. In certain types of transmission, a caller may receive confirmation of receipt of a message by the recipient. It is of course within the scope of this invention to provide confirmation to the caller that the message was delivered and to include a further image into such confirmation message.

The master and slave modules 40, 50 may do all the image insertion into the various transmissions mentioned above. Essentially, the master 40 may receive a caller message and insert an appropriate image (text or graphic) at an appropriate point, prior to relaying this compound message to the recipient. In parallel, the master 40 and slave unit 50 send an image back to the caller across the network. Having a slave unit 50 is not necessarily essential to the invention as all work may be done by the master unit 40. However, it is anticipated that in order to provide an efficient system, such a master/slave network will be required, with slave units 50 fulfilling the role of feeding back confirmations of receipt to callers with an added supplementary image, whilst others provide the image to callers prior to message receipt and still others providing the image embedding to the recipient message.

Also, whilst master and slaves are shown, it will be realised that supplementary image insertion at the various stages may be done by multiple masters working autonomously.

Other variations to the details of embodiments will be within the scope of the invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for transmitting pre-recorded images using telecom networks comprising:
    detecting when a telecommunications apparatus is used by a caller to send a message to a recipient;
    establishing a connection with a telecommunications apparatus of the recipient;
    thereafter, displaying a supplementary image at the telecommunications apparatus of the caller in addition to, or to replace, conventional connection messages,
        if the recipient does not answer during a predetermined time period, then replacing the supplementary image by connection message text, and
        if, during transmission of the supplementary image to the caller, a connection is established between the caller and the recipient, transmission of the supplementary image is terminated.

2. The method of claim 1, wherein a message to be transmitted to the recipient from the caller comprises a mixed media audio/video message and, wherein the supplementary image is presented for viewing to the caller prior to a connection between the caller and the recipient being established or prior to transmission of the message from the caller.

3. The method of claim 1, wherein the supplementary image comprises at least one of an advertising content, an information content, or a combination thereof.

4. The method of claim 1, wherein the supplementary image is presented for viewing to the caller prior to a connection between the caller and the recipient being established.

5. The method of claim 1, wherein the supplementary image is conveyed only to telecom system users who have indicated a willingness to receive the supplementary image.

6. The method of claim 1, wherein the supplementary image insertion is available to all network service providers.

7. Apparatus for transmitting pre-recorded images using telecom networks, whereby when telecommunications apparatus is used by a caller to send a message to a recipient, a supplementary image is visually transmitted from messaging equipment to the caller in addition to, or to replace, conventional connection messages, wherein the apparatus comprises:
    means for detecting a signal on a telecom system indicating that there is an incoming message transmission;
    means for establishing a connection with a telecommunications apparatus of the recipient; and
    means for responding to the detecting and the connection by conveying a supplementary image or images to the caller in addition to, or to replace, conventional connection messages,
        if the recipient does not answer during a predetermined time period, then the means for responding to the detecting and the connection replacing the supplementary image by connection message text, and
        if, during transmission of the supplementary image to the caller, a connection is established between the caller and the recipient, then the means for responding to the detecting and the connection terminating transmission of the supplementary image.

8. The apparatus according to claim 7, wherein the apparatus is arranged to insert the supplementary image or images into the message and relay the message with the inserted supplementary image(s) to the recipient.

9. The apparatus of claim 8, wherein in the case of text messaging the supplementary image(s) is/are inserted in a part of a message from the caller and will be visible to the recipient on retrieval of the text message.

10. The apparatus of claim 7, wherein a message to be transmitted to the recipient from the caller is a mixed media audio/video message and, wherein the supplementary image is presented for viewing to the caller prior to connection between the caller and the recipient being established or prior to transmission of the message from the caller.

11. The apparatus of claim 7, wherein the apparatus comprises cellular/wired telecommunications systems and other terrestrial or satellite transmissions, or email transmission systems capable of receiving text messaging.

12. The apparatus of claim 11, wherein the telecommunications system is configured so as to convey the supplementary images only to system users who have indicated a willingness to receive the supplementary images.

13. The apparatus of claim 7, wherein the supplementary image is associated with an audible message and transmitted to the caller during a predetermined time period.

14. The apparatus of claim 13, wherein the predetermined time period is selected by an advertising organization.

* * * * *

UNITED STATES PATENT AND TRADEMARK OFFICE
CERTIFICATE OF CORRECTION

PATENT NO.        : 8,391,449 B2
APPLICATION NO.   : 09/858174
DATED             : March 5, 2013
INVENTOR(S)       : Butterworth It is certified that error appears in the above-identified patent and that said Letters Patent is hereby corrected as shown below:

In the Specifications

In Column 2, Line 58, delete "organisation." and insert -- organization. --, therefor.

In Column 2, Lines 59-60, delete "organisation" and insert -- organization --, therefor.

In Column 3, Line 3, delete "implemented; and" and insert -- implemented; --, therefor.

In the Claims

In Column 6, Line 3, in Claim 7, delete "Apparatus" and insert -- An apparatus --, therefor.

Signed and Sealed this
Eleventh Day of March, 2014

Michelle K. Lee
*Deputy Director of the United States Patent and Trademark Office*